United States Patent [19]

Hursell, Sr.

[11] 4,197,155

[45] Apr. 8, 1980

[54] TIRE BUILDING DRUM HAVING THREE ORTHOGONALLY ORIENTED TIRE BUILDING DRUMS

[75] Inventor: Donald E. Hursell, Sr., Kent, Ohio

[73] Assignee: The Goodyear Tire & Rubber Company, Akron, Ohio

[21] Appl. No.: 931,042

[22] Filed: Aug. 4, 1978

[51] Int. Cl.² .............................................. B29H 17/16
[52] U.S. Cl. ..................................... 156/396; 29/33 J; 156/111; 156/414; 408/35
[58] Field of Search ............... 156/111, 394, 396, 405, 156/414–420; 29/33 J, 53; 408/35

[56] References Cited

U.S. PATENT DOCUMENTS

| | | | |
|---|---|---|---|
| 2,028,078 | 1/1936 | State et al. | 156/396 |
| 2,407,152 | 9/1946 | Haase | 156/396 |
| 3,223,573 | 12/1965 | Deist | 156/396 |
| 3,746,597 | 7/1973 | Appleby et al. | 156/396 |
| 3,756,882 | 9/1973 | Vila | 156/405 X |
| 3,909,337 | 9/1975 | Yabe | 156/416 |
| 4,134,783 | 1/1979 | Appleby et al. | 156/396 |

Primary Examiner—John E. Kittle
Attorney, Agent, or Firm—R. S. Washburn

[57] ABSTRACT

Tire building apparatus for building complete uncured tires includes a triad of orthogonally oriented tire building drums mounted on a turret rotatable about an axis inclined at an angle of between 35 and 36 degrees with respect to a horizontal plane. Each of the drums occupies successively two tire fabricating stations wherein the respective drums are oriented horizontally and a third station wherein the building drums successively occupying such third station are oriented vertically and from which completed tires fabricated in the apparatus can be removed vertically and at an elevation above the two fabricating stations so as to eliminate completely interference between the movements of tire building material coming to the machine and of the completed tires removed from the machine. The foregoing abstract is not to be taken as limiting the invention of this application, and in order to understand the full nature and extent of the technical disclosure of this application, reference must be made to the accompanying drawing and the following detailed description.

3 Claims, 4 Drawing Figures

U.S. Patent  Apr. 8, 1980  4,197,155
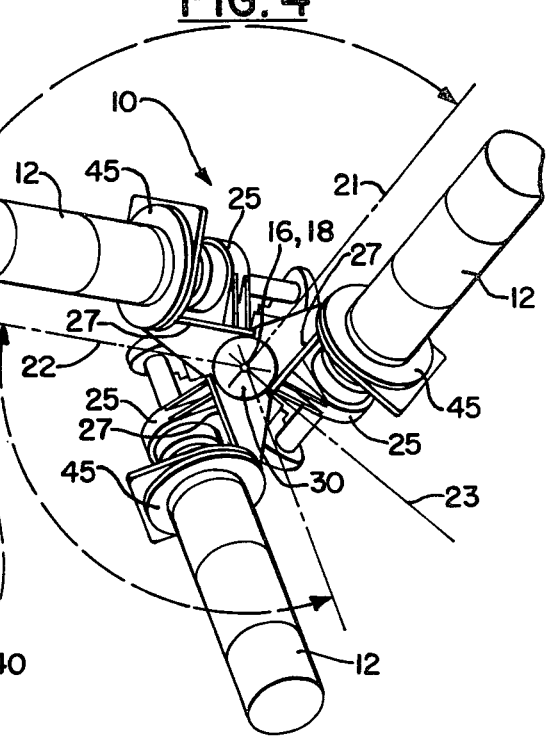
FIG. 2
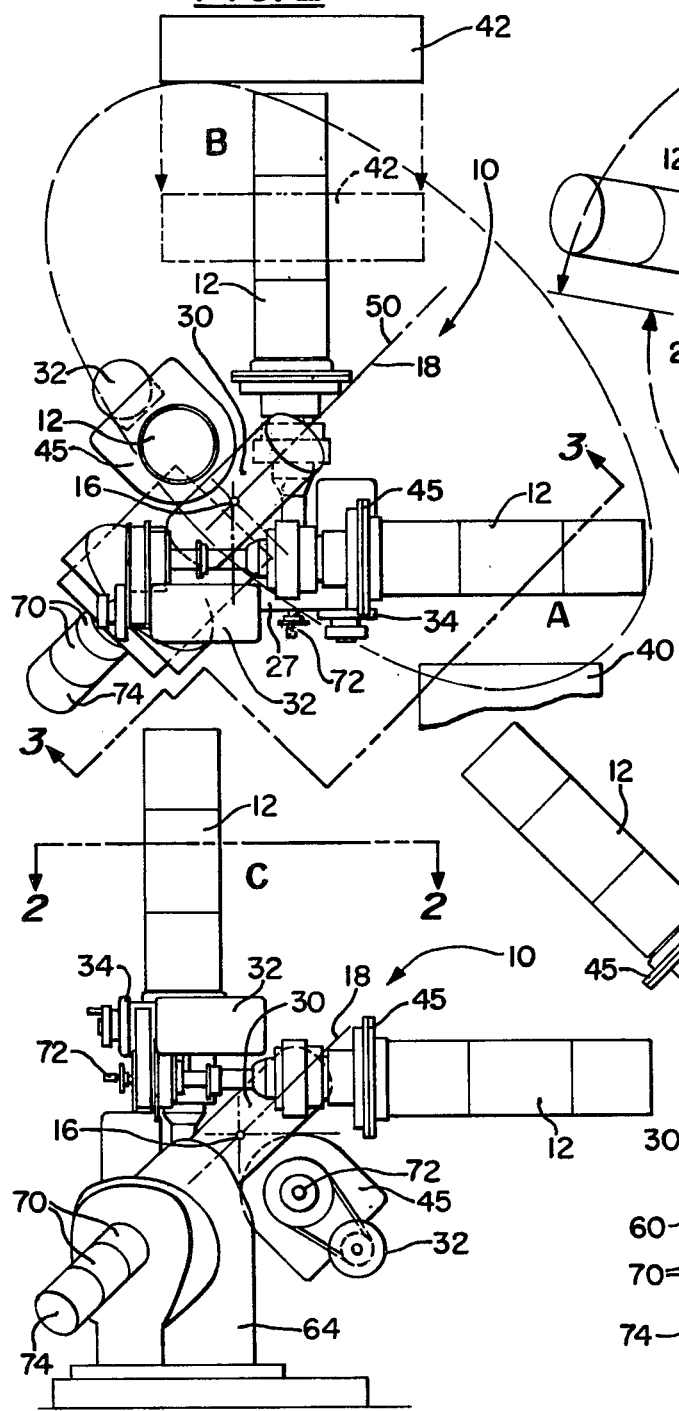
FIG. 1
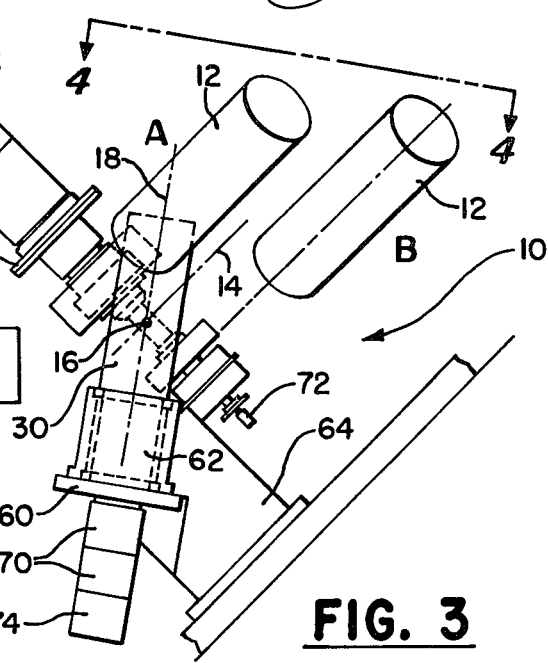
FIG. 3
FIG. 4

TIRE BUILDING DRUM HAVING THREE ORTHOGONALLY ORIENTED TIRE BUILDING DRUMS

The present invention relates to tire building apparatus.

A principal object of the invention is a tire building apparatus constructed and arranged so that a freshly built tire can be removed from the apparatus both vertically and at a different elevation which cannot interfere with the movement of tire building materials to the apparatus.

An additional object of the invention is a tire building apparatus providing improved utilization of floor space and improved convenience of delivery of tire building materials to the apparatus.

A further object of the invention is the provision of an apparatus employing a triad of identical tire building drums each of which successively occupies three stations in one of which stations the tire building drum is oriented with its axis vertical to enable the convenient removal of a finished tire from the apparatus in a vertical direction and from a position elevated with respect to the building drums positioned in the other two stations.

The foregoing and other objects are achieved by an apparatus comprising turret means mounted for rotation about an inclined axis which axis is oriented at an angle of between 35 and 36 degrees with respect to a horizontal plane, a triad of identical tire building drums mounted on said turret for rotation about respectively orthogonally related drum axes; said orthogonally related drum axes being non-intersecting and spaced apart from each other and from said inclined axis to accommodate bearing means by which said drums are supported; rotation means associated respectively with each said drum means to effect rotation thereof independently of the rotation of the other two drums; indexing means associated with said turret means to effect intermittent rotation of said turret means successively to position each of said drums to an axially vertical orientation.

To acquaint persons skilled in the arts most closely related to the present invention, certain preferred embodiments thereof illustrating a best mode now contemplated for putting the invention into practice are described herein by and with reference to the annexed drawings forming a part of the specification. The embodiments shown and described herein are illustrative and as will become apparent to those skilled in these arts can be modified in numerous ways within the spirit and scope of the invention defined in the claims hereof.

In the drawings:

FIG. 1 is an elevation view of an apparatus embodying the invention;

FIG. 2 is a plan view of the apparatus of FIG. 1;

FIG. 3 is an elevation view of the apparatus of FIG. 1 taken as indicated by the line 3—3 in FIG. 2;

FIG. 4 is an oblique view of the apparatus of FIG. 1 taken as indicated by the line 4—4 in FIG. 3.

The apparatus 10 depicted in the several figures includes three tire fabricating drums 12. Only three drums are included in the apparatus, each being of conventional tire building drum design. The three drums provide a complete triad of drums which successively occupy each of the three stations of the apparatus.

As best seen in FIG. 2, two of the drums occupy respectively stations designated as first station A and second station B while the third drum occupies a vertical station C in which station the completed tires can be removed upward axially from the drum.

In stations A and B the drums are rotatable about horizontal axes.

As best seen in FIG. 3, the drum occupying station A extends parallel to and is spaced upwardly with respect to a horizontal plane 14, the spacing in the present embodiment being 10 inches. The drum in station B extends parallel to the horizontal plane and is spaced below that plane a distance also of 10 inches.

As best seen in FIGS. 1 and 2, the drum occupying the vertical station C, that is, having its axis perpendicular to the horizontal plane 14, is spaced from the intersection 16 of that plane with an inclined axis 18 an identical distance, namely, 10 inches. The respective drum axes are oriented orthogonally with respect to the axes of the other two drums.

In FIG. 4, three reference lines 21,22,23 are shown intersecting at a common point, i.e. the intersection 16, lying in the inclined axis and in FIG. 4 are equally angularly spaced about the point of intersection. The respective drum axes are parallel to and spaced equally from the respectively associated reference lines.

The respective drums 12 are supported for rotation in bearing means 25 which are respectively affixed to pads 27 carried by suitable brackets fixed on a turret spindle 30 whose rotation axis is the inclined axis 18 previously referred to. The 10-inch spacing between the respective drum axes and the associated reference lines is determined to suit the diameter and weight of the individual building drums and the bearing size necessary to accommodate the drum dimensions.

As best seen in FIGS. 1 and 2, each of the drums is provided with known drive means 32 to effect rotation of the drum independently of the other two drums.

The drive means illustrated are adapted to effect also rotation of screw means by which the respective beads of a tire carcass on the building drum can be moved toward one another to effect the shaping of a tire carcass band built on the drum. Most conveniently, a conventional clutch and brake assembly 34 which is actuable to cause rotation of the building drum together with the operating screw means and alternatively to stop rotation of the building drum and rotate only the operating screw means. Such mechanisms are well known and need no further description here.

As indicated schematically in FIG. 2, station A can be provided with suitable server means 40 for the delivery to the drum of running length sheet material, that is, the tire liner gum and tire cord-reinforced ply as required for the tire to be fabricated.

In like manner in station B is shown in schematic form a transfer means 42 by which an inextensible belt assembly, which assembly can include an endless tread, can be placed concentrically about the tire carcass band and joined thereto. The transfer means as indicated has a ring constructed and arranged to accommodate the belt and tread assembly in endless form. Alternatively, station B can as easily be equipped to apply to the tire carcass on the drum occupying that station a plurality of running length belt plies which are wrapped about the carcass to build the belt directly thereon.

Optionally but preferably, stations A and B can be provided with support means selectively engageable with the building drums occupying the respective stations to provide further support of the building drums.

A notable feature of the apparatus is the successive location of the triad of building drums 12 in the vertical station C. In this station, wherein the axis of the building drum is oriented vertically, a freshly fabricated tire can be readily removed upwardly by a stripping device constructed and arranged to engage the tire and carry it upwardly to overhead conveying means readily adapted to serve a plurality of tire building apparatus. The vertical orientation enables the direct line movement of the completed tire with a minimum of interference with the ongoing tire building operations, and the removal of the tire is in no way obstructed by any part of the apparatus. Also, because of the division of the several tire building operations which are assigned to the respective stations A and B, means for placing the inboard bead core can be provided for automatically prepositioning such bead core on an inboard bead carrier 45 capable of disposing the bead core in axial registry with the carcass band while the drum occupies station A. The arrangement is also advantageous in the saving of floor space and avoidance of interference with movement of tire building materials to the building apparatus.

To carry the triad of building drums successively into the stations described, the apparatus includes turret means having the turret spindle 30 rotatable intermittently about the inclined axis 18. The angle of inclination of the axis is critical and must lie between 35 and 36 degrees with respect to the horizontal plane 14 and in particular is determined to be at a theoretically ideal angle of 35 degrees, 15 min. and 51.8 sec., which is the angle whose tangent is 0.707106. Persons skilled in the related arts will recognize that because of loads and deflections this angle may not be precisely at the ideal orientation when the respective drums are precisely horizontal in the respective stations A and B.

The inclined axis 18 about which the turret spindle rotates lies in a vertical plane 50. Because the respective reference lines 21,22,23 and the rotation axes of the drums are orthogonally related, that is, each being perpendicular relative to the other two, the vertical plane 50 will be equally angularly spaced relative to the vertical planes coincident with the rotation axes of the respective drums 12 in stations A and B.

To provide intermittent rotation of the turret spindle 30 so as to successively position each building drum in each of the respective three stations A, B, and C, intermittent driving means such as a three-position Geneva drive plate 60 is mounted coaxially on the spindle 30 and is actuated to rotate the spindle through angles of 120 degrees about its inclined axis and to stop and hold the spindle in each of its successive 120 degree angular movements. Spindle bearing means 62 for supporting the spindle rotatably are fixed in a turret base 64 suitably fixed on the operating floor.

Rotary joint means 70 provide a plurality of fluid connections by which operating fluid is communicated to individual passages formed in the spindle 30. These passages are respectively connected to rotary joints 72 relatively rotatably mounted upon coaxially extending elements of the respective building drums 12.

Electric power is supplied to the spindle by way of a slip ring joint 74 also carried by the spindle extension of the turret. The electrical conductors carried in the spindle are connected individually to the drive means of the respective building drums.

Pressurized air communicated by way of the rotary joints 70, the passages in the spindle, and the rotary joints 72 of the respective building drums, is used to effect the radial expansion of elements of each drum independently of the other two drums so as to engage the tire carcass band fabricated on the drum with inextensible tire bead cores disposed therearound by bead carrier means including the carrier 45.

While certain representative embodiments and details have been shown for the purpose of illustrating the invention, it will be apparent to those skilled in the art that various changes and modifications may be made therein without departing from the spirit or scope of the invention.

What is claimed is:

1. A tire building apparatus comprising turret means mounted for rotation about an inclined axis which axis is oriented at an angle of between 35 and 36 degrees with respect to a horizontal plane;
   a triad of identical tire building drums mounted on said turret for rotation about respectively orthogonally related drum axes;
   said orthogonally related drum axes being non-intersecting and spaced apart from each other and from said inclined axis to accommodate bearing means by which said drums are supported;
   rotation means associated respectively with each said drum means to effect rotation thereof independently of the rotation of the other two drums; and
   indexing means associated with said turret means to effect intermittent rotation of said turret means successively to position each of said drums to an axially vertical orientation.

2. A tire building apparatus comprising a first and a second tire fabricating station and a third station;
   turret means mounted for rotation about an inclined axis which axis is oriented at an angle of between 35 and 36 degrees with respect to a horizontal plane and fixed in a vertical plane oriented at 45 degrees from and between said first and said second station;
   three identical tire building drum means, each said drum means being mounted for rotation about an axis extending in orthogonal relation with respect to the axes of the other two drum means;
   each drum axis being parallel to and spaced from a respectively associated reference line, the three of which reference lines are mutually perpendicular and intersect in said inclined axis;
   bearing means fixed in said turret means to support each said drum means for rotation;
   indexing means for effecting intermittent rotation of said turret means and to position each said drum means successively in said first station where its rotation axis is parallel to and spaced from said horizontal plane, thence into said second station where its axis is parallel to and spaced oppositely with respect to said horizontal plane, and thence into said vertically oriented station wherein its axis extends vertically and parallel to said vertical plane, said vertical station being adapted for the removal of a completed tire from drum means occupying that station.

3. A tire building apparatus having a first station wherein a carcass band is built on building drum means, a second station wherein said carcass band is shaped to toroidal form on said drum means, and a third station whereat said carcass band in toroidal form is removed from said drum means, said apparatus comprising a triad of building drum means respectively rotatable about orthogonally arranged drum axes, and turret means having bearing means respectively mounting each said drum means, said turret means being rotatable about an inclined axis in a vertical plane oriented at 45 degrees with respect to said first and said second station and between 35 and 36 degrees with respect to said horizontal plane, and indexing means for intermittently indexing said turret means to position each said drum means successively in said third station whereat its axis is oriented vertically.

* * * * *